Figure 4:
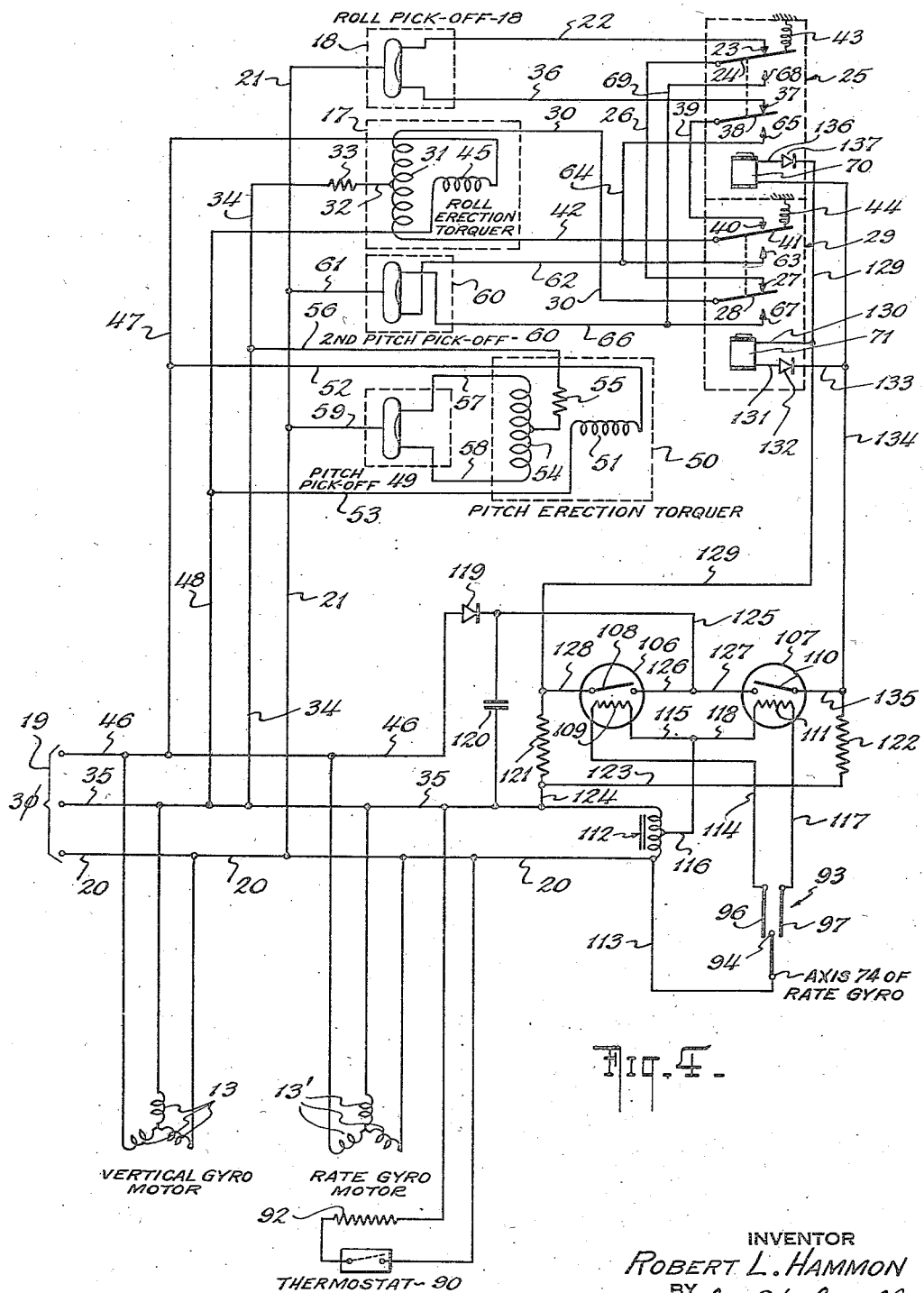

Jan. 28, 1958   R. L. HAMMON   2,821,087
SYSTEM FOR MODIFYING THE MONITORING CONTROLS OF
AN AIRCRAFT GYROSCOPIC REFERENCE INSTRUMENT
Filed Oct. 21, 1954   2 Sheets-Sheet 1
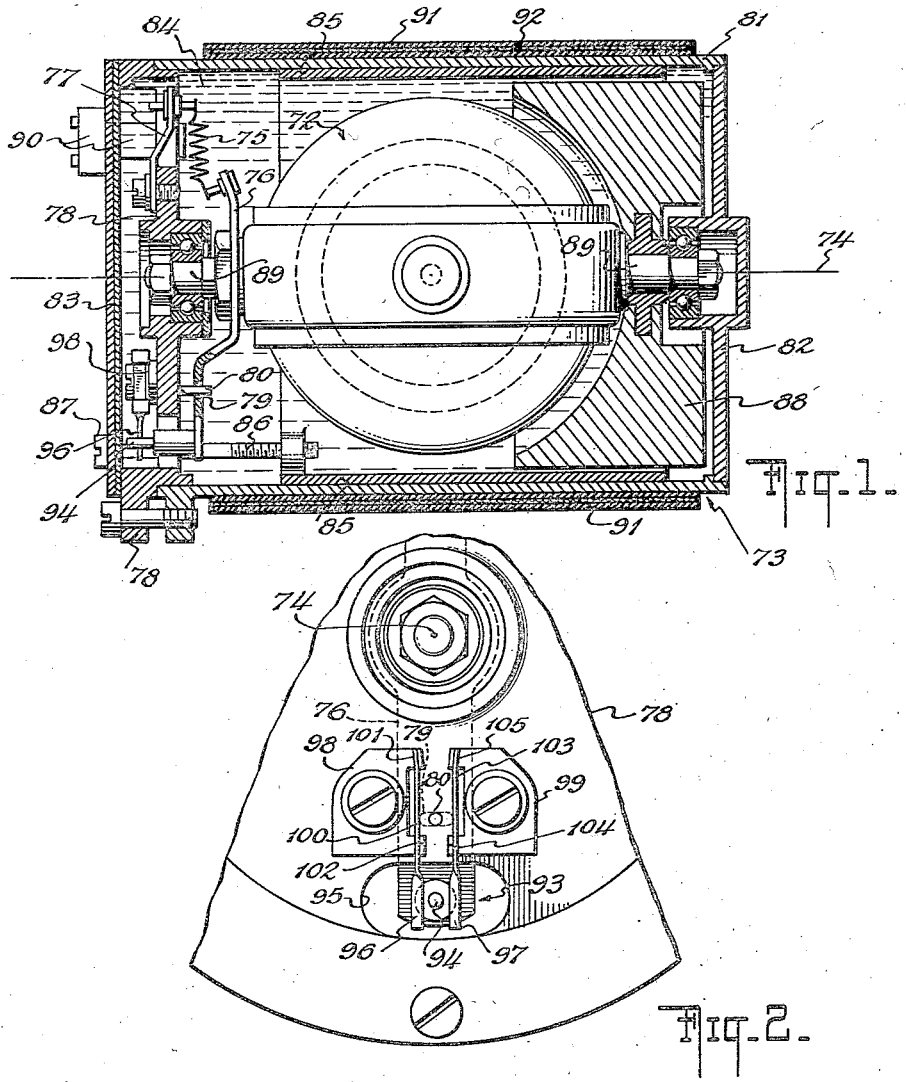
Fig. 1.
Fig. 2.
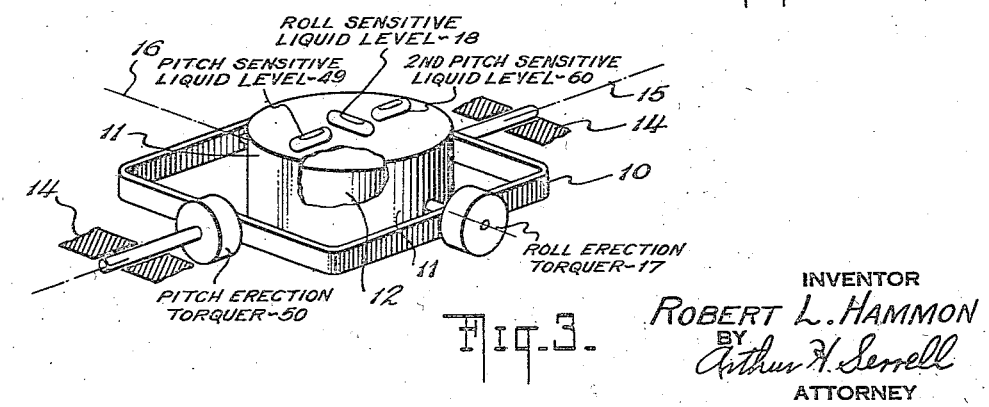
Fig. 3.
INVENTOR
ROBERT L. HAMMON
BY
Arthur H. Serrell
ATTORNEY INVENTOR
ROBERT L. HAMMON
BY
Arthur H. Serrell
ATTORNEY United States Patent Office 2,821,087
Patented Jan. 28, 1958

2,821,087

SYSTEM FOR MODIFYING THE MONITORING CONTROLS OF AN AIRCRAFT GYROSCOPIC REFERENCE INSTRUMENT

Robert L. Hammon, Fresh Meadows, N. Y., assignor to Sperry Rand Corporation, a corporation of Delaware Application October 21, 1954, Serial No. 463,792

11 Claims. (Cl. 74—5.41)

This invention relates to an aircraft gyroscopic reference instrument with monitoring controls and particularly is directed to a system for modifying the operation of the monitoring controls during turns of the craft about its yaw axis.

Instrument flying requires instantaneous knowledge of aircraft pitch, roll and heading conditions. Instrumentation giving pitch and roll information to the pilot is provided by a gyro vertical or artificial horizon. A directional gyro slaved to a magnetic compass or other directional reference provides the required heading information. Both of the noted types of gyroscopic instruments require monitoring controls due to the influence thereon of gimbal bearing friction, earth's rate and other effects peculiar to the problem of flight relative to a spherical earth.

In a directional type gyroscope, the monitoring controls couple the gyro to a compass or other directional reference so that the azimuthal position of the gyro is fixed in relation to the reference. This coupling is known in the art as slaving and the monitored instrument is known as a slaved directional gyroscope. The monitoring control for a gyro vertical instrument couples a gravity responsive reference such as a pendulum or liquid level to the gyro. This coupling maintains the gyro in a continuously erected condition with its spin axis in a vertical or substantially vertical position.

The major cause of errors in aircraft gyroscopic instruments of the characters noted is due to the effect of centripetal acceleration during craft turns about its yaw axis on the provided references, the peak errors occurring at relatively low rates of turn. In both of the noted gyroscopic reference instruments, the accuracy of the information given by the same is considerably improved by modifying the normal monitoring controls. Such modification within the scope of the present inventive concepts includes the disablement of the normal slaving or erection controls for a directional gyro or gyro vertical, the disablement in particular of only the roll erection means of a gyro vertical, as well as the transfer of the roll erection torquer of a gyro vertical from the normal roll gravitational control to a pitch gravitational control.

In accordance with the improved system, the operating point for effecting modification of the monitoring means is set at a predetermined low craft turn rate such as fifteen degrees per minute to eliminate the peak turn errors in the gyroscopic instruments. The elements of the system are also adjusted so that the same operates with a minimum of time delay before cut-off, disablement or modification of the monitoring controls occurring on entry to a turn and a minimum of delay in restoring normal slaving or erection upon completion of the turn.

An aircraft flying in substantially straight and level condition is subject to oscillatory yaw. Periods for this oscillation vary up to eight seconds with fighter aircraft exhibiting the highest yaw frequency. Under autopilot control, backlash, friction, and the degree of control tightness establish a low level yaw oscillation. In manual flight more abrupt control motions, as well as gusts, provide transient oscillatory yaw conditions. The improved system is adjusted to be insensitive or unresponsive to oscillatory yaws of the craft in straight flight. The adjustment is also such that the system is responsive to turns of the craft above a predetermined rate when oscillatory yaw is superimposed on turns of the craft. The system consequently is able to distinguish between yaw oscillations of the craft and turn rates of relatively low magnitude. One of the objects of the present invention is to provide a control system of the type described that is responsive to low rates of turn of the craft, operates with a minimum of time delay and is insensitive to oscillatory yaw.

In accordance with the invention, the system includes a rate gyro that is responsive to turns and oscillatory yaw of the craft about its yaw axis. The damping of the rate gyro is adjusted and maintained so as to obtain the operating characteristic of the system which renders the same responsive to turns of a predetermined rate while it is unresponsive to oscillatory yaw of the craft.

Further features of the invention are provided by a differential relay means providing a differential time delay for the system of the required magnitude, and a switching device cooperating therewith having an operating part controlled by the rate gyro.

Other objects, features and structural details of the present invention will become apparent in the following detailed description thereof in connection with the accompanying drawings showing a preferred embodiment of the subject matter in which, Fig. 1 is a side elevation view of the rate gyro unit of the system, the casing being in lengthwise vertical section to show the interior parts of the unit, Fig. 2 is an enlarged front elevation view showing the switch operated by the rate gyro unit, Fig. 3 is a perspective view of an aircraft gyroscopic reference instrument of the gyro vertical type utilized for illustrative purposes in showing a practical embodiment of the present inventive concepts, and Fig. 4 is a schematic view and wiring diagram of the elements of the system showing the same in a preferred arrangement.

As particularly shown in Fig. 3, the gyroscopic reference instrument illustrated is a conventional type of aircraft gyro vertical with a gimbal ring 10 and rotor case 11. The case 11 includes a gyroscopic rotor 12 mounted to spin about a substantially vertical axis. Suitable means are provided to spin the rotor 12 in the form of an electric motor whose windings are designated at 13 in Fig. 4. The rotor case 11 is mounted in a fixed frame or housing, a portion of which is indicated at 14, by means of the gimbal ring 10, the frame or housing being suitably connected in a fixed relationship to the aircraft. The arrangement of the parts is such that the major axis 15 of the universally supported rotor case 11 is directed fore and aft of the craft. This corresponds to the roll axis of the gyroscopic reference instrument. Relative motion occurs about axis 15 between the gimbal ring 10 and frame 14 as the craft moves from the reference condition established by the gyroscopic instrument or banks. Likewise, the minor axis 16 of the rotor case 11 is directed athwartships of the craft. Relative motion occurs about axis 16 between the gimbal ring 10 and the rotor case 11 as the craft moves from the reference condition established by the gyroscopic instrument or departs from a level condition about its pitch axis to assume a dive or climb attitude.

The monitoring means controlling the gyroscopic instrument shown in Fig. 3 include a roll torquing device or motor 17 designated in the drawing as a roll erection torquer. Motor 17 is effective to provide a torque about axis 16 that operates to precess the motor case 11 about axis 15 so that the case 11 is maintained in a level condition in relation to the roll or bank axis of the craft. Torquer 17 is operated by the signal of a roll sensitive liquid level 18 or the other pick-off. As shown, the liquid level 18 is mounted on the case 11 to detect tilt of the case from a level condition about axis 15. The liquid level 18 constitutes a gravitational means for providing a signal in accordance with tilt of the gyro vertical about its roll axis. The roll torquing device 17 of the erection controls is normally operated by the signal of the roll gravitational device or liquid level 18.

Fig. 4 shows the roll pick-off 18 and torquer 17 connected in their normal relation. As shown, pick-off 18 is energized from one of the leads of a three phase source of supply of alternating current electrical energy, the current source being indicated at 19, the energizing lead at 20 and the connecting lead at 21. One of the output leads 22 of the pick-off 18 is connected to torquer 17 by way of a closed contact 23 and armature 24 of a compound relay 25, a lead 26 from the armature 24 to a closed contact 27 and armature 28 of a second compound relay 29, and lead 30 to one end of the center-tapped control winding 31. The center tap of winding 31 is connected to the source of supply 19 by way of lead 32, a voltage dropping resistor 33 and leads 34 and 35. The second of the output leads 36 of the pick-off 18 is connected to torquer 17 by way of a closed contact 37 and armature 38 of the relay 25, a lead 39 from the armature 38 to a closed contact 40 and armature of relay 29, and lead 42 from armature 41 to the opposite end of the torquer winding 31. As shown, the armatures 24 and 38 are ganged and are normally held in engaged relation with the respective contacts 23 and 37 by the spring 43, the relay 25 being in an unenergized condition. The armatures 41 and 28 are also ganged and are held in engagement with the respective contacts 40, 27 by the spring 44, the relay 29 being in unenergized condition. The fixed or constantly excited field winding 45 of the torquer 17 is energized from source 19 by way of connected leads 46 and 47 and lead 48 to lead 35. In normal operation of the roll erecting means, the pick-off 18 provides a null signal with a level condition of the case 11. With tilt from a level condition, the torquer 17 is differentially energized to produce the properly directed torque to restore the case to a level condition relative to its roll axis 15. The required energy to accomplish the levelling is provided either by way of connected leads 22, 26 and 30 or connected leads 36, 39 and 42 depending upon the sense of the tilt detected by the liquid level 18.

The erection controls for the gyroscopic instrument shown in Fig. 3 further include gravitational means for providing a signal in accordance with tilt about the pitch axis 16. This means is provided by a pitch pick-off in the form of a liquid level 49. As shown, the liquid level 49 is fixed in relation to the case 11 to detect an out of level condition thereof about its minor or pitch axis 16. The motor operated by the signal of the pitch pick-off 49 is indicated as the pitch erection torquer 50. The torquer or torque motor 50 operates to exert a torque about axis 15 of the instrument and precess the case 11 about axis 16 so that the same is maintained in a level condition with a null output from the liquid level 49. As shown in Fig. 4, motor 50 includes a constantly excited winding 51 energized from source 19 by way of leads 46, 47, lead 52 connecting one end of the winding 51 to lead 47, and lead 53 from the other end of the winding to leads 48 and 35. The center-tapped control field winding 54 of the motor 50 is connected to the source 19 by way of a voltage dropping resistor 55 and lead 56 to the leads 34, 35. One end of winding 54 is connected to pick-off 49 through lead 57. Lead 58 connects the other end of the winding 54 to the pick-off 49. The input to the pick-off 49 is supplied by way of leads 20, 21 and lead 59. The pitch erecting or monitoring control for the instrument functions in the same manner as described hereinbefore relative to the normal functioning of the roll monitoring control. In the specific form of the invention shown in Fig. 4, the pitch erection control is not modified or disabled during turns of the craft. In this embodiment of the invention the system operates to transfer the operation of the roll torquing device or motor 17 from the roll pick-off 18 to a normally ineffective second pitch pick-off during turns of the craft about its yaw axis. As shown in Figs. 3 and 4, this additional pitch gravitational means is a second pitch pick-off or liquid level 60 that is fixedly mounted on the case 11 in a position to provide an output in accordance with tilt about the axis 16 of the instrument from a level condition. The first step in the transfer procedure is disablement of the roll erection means during a turn which per se is also a modifying operation for the monitoring controls of an aircraft gyroscopic reference instrument within the purview of the present invention.

As shown in Fig. 4, the liquid level 60 is energized from source 19 by way of leads 20, 21 and lead 61. One of the output leads 62 of pick-off 60 is connected to the normally open contact 63 engageable with armature 41 of relay 29. Through lead 64 connected to lead 62, the same end of the pick-off 60 is connected to normally open contact 65 engageable with armature 38 of relay 25. The other of the output leads 66 of pick-off 60 is connected to the normally open contact 67 engageable with armature 28 of relay 29. Pick-off 60 is also connected to the normally open contact 68 engageable with armature 24 of relay 25 through lead 69 and lead 66. The coils of the respective relays 25 and 29 are indicated at 70 and 71. The relays 25 and 29 of the system are operated differentially and constitute a means for modifying, disabling or transferring the monitoring controls of the gyroscopic instrument as herein disclosed. With operation of relay 25 upon energization of coil 70, the ganged armatures 24, 38 are urged against the action of spring 43 into a closed condition with contacts 68 and 65, respectively. This disables the normal roll monitoring control by breaking the connection between pick-off 18 and torquer 17. With operation of the relay 25, the normally ineffective pitch pick-off 60 is rendered effective through connection of the same to the roll erection torquer 17. This connection is obtained by way of lead 62, lead 64, closed contact 65 and armature 38, lead 39, closed contact 40 and armature 41 of relay 29 and lead 42 to one end of the control winding 31 of the torquer. The second connection is obtained by way of lead 66, lead 69, closed contact 68 and armature 24, lead 26, closed contact 27 and armature 28 of relay 29 and lead 30 to the other end of the control winding 31 of the torquer. With operation of relay 29 upon energization of coil 71, the ganged armatures 41 and 28 are urged against the action of spring 44 into a closed condition with contacts 63 and 67, respectively. This operation also disables the normal roll monitoring control by breaking the connection between pick-off 18 and torquer 17 at the contacts 40 and 27. With operation of relay 29, the normally ineffective pitch take-off is also rendered effective through further connections of the same to the roll erection torquer. This connection is obtained in one instance from pick-off 60, lead 62, closed contact 63 and armature 41, and lead 42 to one end of the control winding 31 of torquer 17. In the other instance, the connection is obtained by way of lead 66, the closed contact 67 and armature 28, and lead 30 to the opposite end of the control field winding 31 of the erection torquer 17. Because of the fact that the roll gravity responsive reference or liquid level 18 of a gyro vertical is particularly subject to error due to the effect of centripetal accelerations thereon during craft turns, it is necessary to disable the roll erection controls or transfer the roll erection torquer to a gravity responsive member that is not subject to the accelerations such as pitch pick-off 60. In either instance, the performance of the instrument is very considerably improved as the error in the roll pick-off is not reflected in the indications of the instrument.

The system is effective through the described relays 25 and 29 to modify the operation of the monitoring controls of an aircraft gyroscopic reference instrument. As shown particularly in Figs. 1, 2 and 4, the system includes a damped rate gyro that is responsive to turns and oscillatory yaw of the craft about its yaw or normally vertical axis. As represented in Fig. 1, the rate gyro includes a spherically shaped closed rotor case 72 that is supported by spaced bearings in a fluid tight housing 73 with freedom about a precession axis 74. A gyroscopic rotor, shown in dotted lines in Fig. 1, is situated within the closed case 72 so that its spin axis is normally horizontal and perpendicular to the precession axis 74. A suitable motor with windings 13', as shown in Fig. 4, is provided to spin the gyroscopic rotor of the rate gyro. the housing 73 of the rate gyro unit is fixedly mounted on the aircraft so that the case 72 precesses about its axis 74 in accordance with the sense and turn rate of the craft. Further detailed structure of the rate gyro shown in Fig. 1 includes a torsional restraint between the case 72 and housing 73 elements thereof in the form of a spring 75. As shown one end of the spring 75 is connected to the upper portion of an arm 76 which is suitably fastened to the case 72. The other end of the spring 75 is fixed to an extending element 77 that itself is suitably secured to the wall of an inside bearing ring 78. The degree of motion of the case 72 relative to the housing 73 is limited by a stop structure consisting of a radial slot 79 in the lower portion of the arm 76 and a pin 80 that extends through the slot and is fixed to the bearing ring 78. The fluid tight housing 73 is constituted of a cylindrical tube 81, one end of which is closed by a bearing plate 82 and the other end is closed by a plate 83 that is suitably connected to bearing ring 78. Ring 78 is independently connected to the tube 81. The housing 73 is filled with a damping fluid 84 that reduces bearing friction to a minimum by flotation of the closed spherical rotor case 72. The damping of the rate gyro of the system is important being adjusted to make the system responsive to turns of the craft above a turn rate of, for example, fifteen degrees per minute with superimposed oscillatory yaw turns of the craft where the oscillatory yaw period is less than eight seconds and its amplitude is less than three degrees. The damping is also such that the system is unresponsive to oscillatory yaw of the craft in straight flight where the period of yaw is less than eight seconds.

The provisions made in the rate gyro shown in Fig. 1 to effect the required damping adjustment and maintain the same constant in operation include damping adjustment means in the form of a translatable sleeve 85 telescopically mounted in the housing tube 81. The position of the sleeve within the tube 81 is determined by a screw fastening 86 with a rotatable head 87 that extends outside of the closing end plate 83. Sleeve 85 cooperates with a cylindrical member 88 movable with the case 72 being mounted on a trunnion 89 extending therefrom. The member 88 moves about the precession axis 74. The length of the fluid filled volume between the member 88 and sleeve 85 is varied by the screw fastening 86 so that the necessary damping factor is obtained. The setting is made with the fluid within the housing at a desired temperature as determined by a thermostat 90 which operates to control a resistance type heater 91 that surrounds the tube 81. As shown in Fig. 4, the heating resistor 92 of this arrangement is located in a series circuit with the thermostat 90 that is across the leads 20, 35 to the electrical supply source 19. The thermostat 90 located within the housing 73 is effective to close the circuit to the heater 91 to maintain the fluid at the desired temperature. The rate gyro unit of the system operates to control the closure of a turn sensitive switch indicated at 93 in Fig. 2. The moving element or closing part of the switch 93 is provided by a conducting pin 94 that extends from the bottom of the arm 76 fixed to the case 72 through an opening 95 in the bearing ring 78. Pin 94 is situated along the axis 74 at a radial distance therefrom corresponding to the length of the arm 76 below the axis. As shown in Fig. 2, the pin 94 is located between two spaced relatively fixed contact elements for the switch, respectively indicated at 96 and 97. The contacts 96 and 97 are spaced sufficiently close to enable the movable pin 94 to engage the same before the movement of the pin 94 is limited by the coaction of the stop pin 80 in the slot 79 of arm 76. In operation, only one of the contacts 96, 97 is engaged at a given instant depending upon the direction of the turn of the craft as sensed by the rate gyro with the resulting motion of the pin 94 either in a clockwise or counterclockwise direction as viewed in Fig. 2. The contact parts 96 and 97 of the switch 93 are mounted within the housing 73 on the bearing ring 78 by means of mounting plates 98 and 99. The plates 98 and 99 are fixed to the ring 78 by suitable screw or other fastenings. Contact 96 includes a resilient portion 100 that is secured as indicated at 101 to the plate 98 at one end thereof, the connection being such as to bias the same against a lug 102 extending from the plate. The contact element 97 is similarly constructed, the resilient portion 103 thereof being braced against lug 104 on plate 99. The end connection of the contact portion 103 to the plate 99 is indicated at 105. The closest spacing of the contacts 96, 97 is consequently determined by the fixed distance between the lugs 102 and 104. As shown, the pin 94 is normally equidistant from the respective contacts 96 and 97. To minimize friction at the switch 93, the ends of the contacts 96 and 97 that engage the pin 94 are twisted through an angle of ninety degrees in relation to the respective resilient portions thereof. Pin 94 constitutes a closing member for the switch 93 that is operatively connected to the rate gyro. As the direction of operation of the pin 94 depends on the sensing of the rate gyro, the normally open switch 93 is turn sensitive.

The system further includes a differential relay providing a time delay for the same. As shown in Fig. 4, the means provided for obtaining the time delay is constituted of tube members 106 and 107.

Tube member 106 includes a switch with a normally open bimetallic blade or closing element 108. The blade is urged to a closed condition by heat from a resistor 109 contained within the tube. Tube member 107 is similarly constructed, the switch closing element being indicated at 110 and the heating resistor at 111. The time delay or relay means described is consequently constituted of a pair of switches having thermally operated closing elements.

The means for energizing the tubes 106 and 107 to close the switches thereof is effected by a circuit which includes the thermal elements or resistors 109, 111 of the respective tubes differentially. This circuit also contains the switching means 93 operated by the rate gyro. As shown, energy is supplied to this normally open circuit by way of leads 20, 35 from the source 19 to an autotransformer 112. Lead 113 from the transformer 112 is connected to the pin 94 or closing element for switch 93. The circuit is closed by engagement of pin 94 with contact 96 through contact 96, lead 114 to the thermal element 109, and leads 115 and 116 to the transformer 112. The circuit is also closed by engagement of pin 94 with contact 97 through contact 97, lead 117, thermal element 111, and lead 118 to return lead 116. With the described arrangement, as the craft turns, either heating resistor 109 or 111 is energized with the cooperation of the switch 93. The time required for the blades 108, 110 of the tubes to change from an open to closed condition and vice versa, is determinative of the delay of the system. This time together with the damping factor of the rate gyro is such that oscillatory yaw of the craft either in straight flight or in turns is prevented from causing incorrect operation of the system.

The tubes 106, 107 of the system are further included in unbalancing relation in a bridge circuit. Energy for the bridge circuit is supplied from source 19 by way of lead 46 and lead 35. The supplied alternating current energy is converted to direct current by a rectifier 119 and smoothing condenser 120 for use by the bridge. Two of the opposing branches of the bridge circuit are provided by the resistors 121, 122 which are connected by common lead 123 and lead 124 to the supply lead 35. The other opposed branches of the bridge are constituted to include the normally open blades 108, 110 of the tubes 106, 107, respectively. As shown, an input to the tubes 106, 107 is provided from rectifier 119 by way of lead 125 and leads 126, 127, respectively. When blade 108 is closed, the bridge provides an output that energizes the coil 71 of relay means 29 to cause the monitoring controls of the instrument to operate in the manner heretofore described. This circuit includes rectifier 119, lead 125, lead 126, closed blade 108, lead 128, lead 129, lead 130, coil 71, lead 131, rectifier 132, lead 133, lead 134, resistor 122, and leads 123, 124 to supply lead 35. When blade 110 is closed, the bridge provides an output that energizes the coil 70 of relay means 25 to cause the monitoring controls of the instrument to function responsive to turns in the opposite sense. This circuit includes rectifier 119, lead 125, lead 127, closed blade 110, lead 135 to lead 134, coil 70, lead 136, rectifier 137, lead 129, resistor 121 and lead 124 to supply lead 35. The rectifiers 132 and 137 in the output circuit of the bridge assure proper sensing for the operation of the relays 25, 29. The relays 25 and 29 constitute a left-right sensing means that is operated by the output of the bridge circuit, such means being constituted by the time delay means of the system.

The system operates to distinguish between oscillatory yaw of the craft in straight flight and oscillatory yaw of the craft during turns above a predetermined rate of fifteen degrees per minute in the following manner. In oscillatory yaw of the craft in straight flight where the period of yaw is less than eight seconds, the closing member 94 of the rate gyro moves to engage the contacts 96 and 97 of the switch 93 alternatively, the time of engagement of the closing member with either of the contacts being insufficient to close either of the switch blades 108, 110 to unbalance the bridge circuit. The heaters 109 and 111 of the tubes 106, 107 in this type of operation are intermittently energized but the energization is not of sufficient duration to render the system operative. In oscillatory yaw turns above the fifteen degree per minute rate of turn, the closing member 94 engages one or the other of the contacts 96, 97 depending on the sense of the turn. The member 94 deflects the engaged contact until its travel limit as determined by the slot 79 and pin 80 is reached. In superimposed yaw, the closing member 94 continually engages the contact initially engaged by the same, and the connection is then of sufficient duration to close the requisite blade 108 or 110 of the time delay means to unbalance the bridge circuit so that one or the other of the coils 70, 71 of the relay means for controlling the modifying action of the system are energized. The damping of the rate gyro and the response time of the delay means of the system are such that the system is responsive to turns of the craft above a turn rate of fifteen degrees per minute with superimposed oscillatory yaw turns of the craft where the oscillatory yaw period is less than eight seconds, its amplitude less than three degrees and the turn rate greater than fifteen degrees per minute.

In the described system, the pull-in time of the delay relay means is greater than one-half the maximum yaw period of the craft or four seconds, the pull-out time of the same being negligible. The system is effective to produce the same results where a thermal delay is provided of a relatively short pull-in time and a pull-out time greater than the maximum yaw period of eight seconds. With this arrangement, the spacing between contacts 96 and 97 of the rate gyro switch 93 is widened so that the closing member 94 intermittently engages one of the noted contacts in oscillatory yaw turns of greater than the predetermined turn rate. This engagement continues until either blade 108 or 110 is closed to unbalance the bridge circuit and render the system operative.

In turns at or above the predetermined rate without oscillatory yaw, the system operates as heretofore described with continuous engagement of the closing member 94 with one or the other of the contacts 96, 97.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an aircraft gyroscopic reference instrument with monitoring controls, a system for modifying the operation of the monitoring controls during turns of the craft about its yaw axis including a damped rate gyro responsive to turns and oscillatory yaw of the craft about its yaw axis, differential relay means providing a time delay for the system, means for energizing said relay means including a circuit with a switch having a movable element operatively connected to said rate gyro, a bridge circuit having said relay in unbalancing relation therein, and means operated by the output of said bridge circuit for modifying the operation of the monitoring controls of the gyroscopic reference instrument, said rate gyro being so damped and the delay time of said relay being such that the system is responsive to turns of the craft above a predetermined turn rate with or without oscillatory yaw superimposed on such turns of the craft when the turn rate is higher than the predetermined rate and is unresponsive to oscillatory yaw of the craft in straight flight.

2. A system for controlling the disablement of the roll erection means of an aircraft gyro vertical instrument during turns of the craft about its yaw axis including a damped rate gyro responsive to turns and oscillatory yaw of the craft about its yaw axis, differential relay means providing a time delay for the system, means for energizing said relay, means including a circuit with a switch having a movable element operatively connected to said rate gyro, a bridge circuit having said relay in unbalancing relation therein, and means operated by the output of said bridge circuit for disabling the roll erection means of the gyro vertical instrument, said rate gyro being so damped and the delay time of said relay being such that the system is responsive to turns of the craft above a predetermined turn rate with or without oscillatory yaw superimposed on such turns of the craft where the turn rate is greater than the predetermined rate and is unresponsive to oscillatory yaw of the craft in straight flight.

3. In an aircraft gyro vertical instrument with erection controls including gravitational means for providing a signal in accordance with tilt of the gyro vertical about its roll axis, a roll torquing device normally operated by the signal of the roll gravitational means, and a normally ineffective gravitational means providing a signal in accordance with tilt of the gyro vertical about its pitch axis; a system for transferring the operation of the roll torquing device from the roll gravitational means to the normally ineffective pitch gravitational means during turns of the craft about its yaw axis including a damped rate gyro responsive to turns and oscillatory yaw of the craft about its yaw axis, differential relay means providing a time delay for the system, means for energizing said relay means including a circuit with a switch having a movable element operatively connected to said rate gyro, a bridge circuit having said relay means in unbalancing relation therein, and means operated by the output of said bridge circuit for transferring the operation of the roll torquing device from the roll gravitational means to the normally ineffective pitch gravitational means, said rate gyro being so damped and the delay time of said relay being such that the system is responsive to turns of the craft above a predetermined turn rate with or without oscillatory yaw superimposed on such turns of the craft when the turn rate is higher than the predetermined rate and is unresponsive to oscillatory yaw of the craft in straight flight.

4. In an aircraft gyroscopic reference instrument with monitoring controls, a system for modifying the operation of the monitoring controls during turns of the craft about its yaw axis including a damped rate gyro responsive to turns and oscillatory yaw of the craft about its yaw axis, time delay means having a pair of thermal elements, means for energizing the thermal elements of said delay means including a circuit with a switch having a closing member operated by said rate gyro, a bridge circuit having said time delay means in unbalancing relation therein, and left-right sensing means operated by the output of said bridge circuit for modifying the operation of the monitoring controls of the gyroscopic reference instrument, said rate gyro being so damped and the response time of said delay means being such that the system is responsive to turns of the craft above a turn rate of fifteen degrees per minute and to oscillatory yaw turns of the craft where the oscillatory yaw period is less than eight seconds, its amplitude less than three degrees and the turn rate greater than fifteen degrees per minute and is unresponsive to oscillatory yaw of the craft in straight flight where the period of yaw is less than eight seconds.

5. A system for controlling the disablement of the roll erection means of an aircraft gyro vertical instrument during turns of the craft about its yaw axis including a damped rate gyro responsive to turns and oscillatory yaw of the craft about its yaw axis, time delay means having a pair of thermal elements, means for energizing the thermal elements of said delay means including a circuit with a switch having a closing member operated by said rate gyro, a bridge circuit having said time delay means in unbalancing relation therein, and left-right sensing means operated by the output of said bridge circuit for disabling the roll erection means of the gyro vertical instrument, said rate gyro being so damped and the response time of said delay means being such that the system is responsive to turns of the craft above a turn rate of fifteen degrees per minute and to oscillatory yaw turns of the craft where the oscillatory yaw period is less than eight seconds, its amplitude is less than three degrees and the turn rate greater than fifteen degrees per minute and is unresponsive to oscillatory yaw of the craft in straight flight where the period of yaw is less than eight seconds.

6. In an aircraft gyro vertical instrument with erection controls including gravitational means for providing a signal in accordance with tilt of the gyro-vertical about its roll axis, a roll torquing device normally operated by the signal of the roll gravitational means, and a normally ineffective gravitational means providing a signal in accordance with tilt of the gyro vertical about its pitch axis; a system for transferring the operation of the roll torquing device from the roll gravitational means to the normally ineffective pitch gravitational means during turns of the craft about its yaw axis including a damped rate gyro responsive to turns and oscillatory yaw of the craft about its yaw axis, time delay means having a pair of thermal elements, means for energizing the thermal elements of said delay means including a circuit with a switch having a closing member operated by said rate gyro, a bridge circuit having said time delay means in unbalancing relation therein, and left-right sensing means operated by the output of said bridge circuit for transferring the operation of the roll torquing device from the roll gravitational means to the normally ineffective pitch gravitational means, said rate gyro being so damped and the response time of said dealy means being such that the system is responsive to turns of the craft above a turn rate of fifteen degrees per minute and to oscillatory yaw turns of the craft where the oscillatory yaw period is less than eight seconds, its amplitude less than three degrees and the turn rate greater than fifteen degrees per minute and is unresponsive to oscillatory yaw of the craft in straight flight where the period of yaw is less than eight seconds.

7. In an aircraft gyroscopic reference instrument with monitoring controls, a system for modifying the operation of the monitoring controls during turns of the craft about its yaw axis including a viscously damped rate gyro responsive to turns and oscillatory yaw of the craft about its yaw axis, a pair of time delay switches having thermally operated closing elements, means for energizing the thermal elements of the time delay switches differentially including a circuit with a normally open, turn sensitive, switch having a closing part operatively connected to said rate gyro, a bridge circuit having said time delay switches in unbalancing relation therein, and relay means operated by the output of said bridge circuit for modifying the operation of the monitoring controls of the gyroscopic reference instrument, said rate gyro being so damped and the response time of said time delay switches being such that the system is responsive to turns of the craft above a turn rate of fifteen degrees per minute and to oscillatory yaw turns of the craft where the oscillatory yaw period is less than eight seconds, its amplitude less than three degrees and the turn rate greater than fifteen degrees per minute and is unresponsive to oscillatory yaw of the craft in straight flight where the period of yaw is less than eight seconds.

8. A system for controlling the disablement of the roll erection means of an aircraft gyro vertical instrument during turns of the craft about its yaw axis including a viscously damped rate gyro responsive to turns and oscillatory yaw of the craft about its yaw axis, a pair of time delay switches having thermally operated closing elements, means for energizing the thermal elements of the time delay switches differentially including a circuit with a normally open, turn sensitive, switch having a closing part operatively connected to said rate gyro, a bridge circuit having said time delay switches in unbalancing relation therein, and relay means operated by the output of said bridge circuit for disabling the roll erection means of the gyro vertical instrument, said rate gyro being so damped and the response time of said time delay switches being such that the system is responsive to turns of the craft above a turn rate of fifteen degrees per minute and to oscillatory yaw turns of the craft where the oscillatory yaw period is less than eight seconds, its amplitude less than three degrees and the turn rate greater than fifteen degrees per minute and is unresponsive to oscillatory yaw of the craft in straight flight where the period of yaw is less than eight seconds.

9. In an aircraft gyro vertical instrument with erection controls including gravitational means for providing a signal in accordance with tilt of the gyro-vertical about its roll axis, a roll torquing device normally operated by the signal of the roll gravitational means, gravitational means for providing a signal in accordance with tilt of the gyro-vertical about its pitch axis, a pitch torquing device operated by the signal of the pitch gravitational means, and a normally ineffective gravitational means providing a second signal in accordance with tilt of the gyro-vertical about its pitch axis; a system for transferring the operation of the roll torquing device from the roll gravitational means to the normally ineffective pitch gravitational means during turns of the craft about its yaw axis including a viscously damped rate gyro responsive to turns and oscillatory yaw of the craft about its yaw axis, a pair of time delay switches having thermally operated closing elements, means for energizing the thermal elements of the time delay switches differentially including a circuit with a normally open, turn sensitive, switch having a closing part operatively connected to said rate gyro, a bridge circuit having said time delay switches in unbalancing relation therein, and relay means operated by the output of said bridge circuit for transferring the operation of the roll torquing device from the roll gravitational means to the normally ineffective pitch gravitational means, said rate gyro being so damped and the response time of said time delay switches being such that the system is responsive to turns of the craft above a turn rate of fifteen degrees per minute and to oscillatory yaw turns of the craft where the oscillatory yaw period is less than eight seconds, its amplitude less than three degrees and the turn rate greater than fifteen degrees per minute and is unresponsive to oscillatory yaw of the craft in straight flight where the period of yaw is less than eight seconds.

10. In an aircraft gyroscopic reference instrument with monitoring controls, a system for modifying the operation of the monitoring controls during turns of the craft about its yaw axis comprising a relay operable to modify the operation of the monitoring controls, a damped rate gyro responsive to turns and oscillatory yaw of the craft about its yaw axis, means providing a time delay for the system including a pair of thermal elements, a circuit differentially including the thermal elements of said time delay means and a switch operated by the damped rate gyro, and means for operating said relay controlled by said time delay means, the damping of the rate gyro and the time response of the time delay means being such that the system is responsive to turns of the craft above a predetermined turn rate and to oscillatory yaw turns of the craft when the turn rate is greater than the predetermined rate and is unresponsive to oscillatory yaw of the craft in straight flight.

11. The combination in an aircraft gyroscopic reference instrument with monitoring controls of, means for modifying the operation of the monitoring controls, a damped rate gyro responsive to turns and oscillatory yaw of the craft about its yaw axis, differential time delay means, circuit means including a switch operated by the damped rate gyro for controlling the operation of said differential time delay means, and means for operating said modifying means controlled by said time delay means, the damping of the rate gyro and the time response of the time delay means being such that the modifying operating means is responsive to turns of the craft above a predetermined turn rate and to oscillatory yaw turns of the craft when the turn rate is greater than the predetermined rate and is unresponsive to oscillatory yaw of the craft in straight flight.

References Cited in the file of this patent

UNITED STATES PATENTS

| | | |
|---|---|---|
| 1,291,695 | Perry | Jan. 14, 1919 |
| 2,542,975 | Adkins | Feb. 27, 1951 |
| 2,643,547 | Konet | June 30, 1953 |